United States Patent [19]

Smith et al.

[11] 4,185,026

[45] Jan. 22, 1980

[54] PROCESS FOR CLEANSING SPENT CLAY FROM THE REFINING OF GLYCERIDE ESTERS

[75] Inventors: Gary W. Smith, Lynn Haven; Dwight E. Leavens, Panama City; Louis R. Sims, Pensacola, all of Fla.

[73] Assignee: Sylvachem Corporation, Jacksonville, Fla.

[21] Appl. No.: 834,965

[22] Filed: Sep. 20, 1977

Related U.S. Application Data

[63] Continuation-in-part of Ser. No. 661,257, Feb. 25, 1976, Pat. No. 4,049,685.

[51] Int. Cl.² .................................................. C11B 13/04
[52] U.S. Cl. .................................... 260/412.5; 252/412
[58] Field of Search ............................. 260/412.5, 412; 252/412

[56] References Cited

U.S. PATENT DOCUMENTS

| 968,092 | 8/1910 | Sulzberger | 260/412.5 |
|---|---|---|---|
| 1,828,035 | 10/1931 | Ellis | 260/412.5 |
| 2,706,201 | 4/1955 | Chaloner et al. | 260/412.5 |
| 3,428,660 | 2/1969 | Morren | 260/412.5 |
| 4,049,685 | 9/1977 | Smith et al. | 260/412.5 |

Primary Examiner—P. E. Konopka
Attorney, Agent, or Firm—Richard H. Thomas

[57] ABSTRACT

Elevated temperature process for deoiling spent crystalline clay from the refining of glyceride esters ("oils") wherein a primary dispersion of such spent clay and aqueous alkali are mixed under pH conditions effective for removing a substantial amount of oily phase from such clay in the form of glyceride esters, thus-treated clay is separated and redispersed with additional aqueous alkali under pH conditions effective for saponifying at least a substantial fraction of the remaining glyceride esters present, then the treated clay is separated from the redispersion.

8 Claims, 2 Drawing Figures

PROCESS FOR CLEANSING SPENT CLAY FROM THE REFINING OF GLYCERIDE ESTERS

This patent application is a continuation-in-part of our U.S. Pat. application Ser. No. 661,257, (now U.S. Pat. No. 4,049,685) filed Feb. 25, 1976, entitled *Process for Cleansing Spent Clay*. The disclosure of that application is incorporated herein expressly by reference.

This invention relates to an improvement in process for cleansing fatty materials including glyceride esters from spent clay, and more particularly to such process wherein the spent clay is washed with aqueous alkali at an elevated temperature.

BACKGROUND OF THE INVENTION

The bleaching of glyceride oils and fats (collectively "oils" herein) often is done with a clay such as an acid clay. The clay becomes spent, i.e., substantially incapable of further economic sorption of color bodies or of other economic use. (Such clay also is used to bleach fatty acids or as a catalyst to assist in polymerizing unsaturated fatty acids to make "dimer" acids and higher polymers.) Frequently such spent clay is mixed with some activated carbon, and the presence of such activated carbon can be tolerated by the instant process.

Usually the spent clay is filtered from glyceride oils in the process of their refining, yielding a cake that often has about 20–55% oil content (mainly glyceride esters) and the balance essentially clay solids. Disposal of such cake as landfill often conflicts with environmental considerations because of oily drainage and/or undesirable degradation or infestation of the oil present. Such perfunctory disposal can cost more than three dollars a cubic yard for hauling, and it also represents a waste of recoverable glyceride esters and/or fatty acids of fair value.

The instant process allows one to adjust the washing operations towards cleansing the clay thoroughly, regardless of how incomplete the initial clay washing turns out to be. Furthermore, the total processing time can be made unexpectedly short because no compromise need be made between conditions for obtaining substantial and rapid oil collection on the one hand and those for virtually complete and rapid clay cleaning on the other. Additionally, the process permits an autogenous (super-atmospheric) pressure saponification operation for obtaining controlled molecular rearrangement as well as recovery of free fatty acids to maximize their utility or value; such conditions are clearly incompatible with a collection of glyceride ester, thus representing a totally unexpected combination of operations in cleansing saponifiable oil from spent clay.

The desirability of recovering as esters various saponifiable oils (which are mostly glyceride esters) from spent bleaching clay has been evident for many years. The U.S. patent art reflects a variety of organic solvent extraction treatments and a variety of aqueous treatments for this purpose. The latter proposals include the use of various surface tension-reducing agents in the water to assist the oil separation or "washing" treatment of the spent clay, for example, added synthetic detergents, sodium aluminate, sodium stannate, sodium fluoride, water-soluble coagulant salts and added or in situ-produced sodium soaps of fatty acids. Of all these treatments, three heretofore patented proposals and a well-known reference text are believed to be the ones most pertinent to the instant process.

U.S. Pat. No. 1,828,035 shows spent clay washing with aqueous saline solution containing caustic soda or caustic potash sufficient for neutralizing the free fatty acids present, but insufficient for saponifying any appreciable proportion of the glycerides present. Such saponification, it is stated, then would cause the emulsification of glycerides and create difficulty in separating same from the aqueous phase. The free fatty acids are completely neutralized at pH about 8. Sodium chloride is stated to be replaceable by sodium sulfate or other salts tending to repress emulsification of fatty oils in the aqueous liquid.

U.S. Pat. No. 2,706,201, to the extent it is directed to separating saponifiable oils from spent clay, shows adding sodium carbonate to a boiling mixture of clay and water "until a distinct alkalinity to phenolphthalein persists." Such pH indication starts at 8.3, although this would take a highly trained eye to notice it, and the red color is reasonably evident to most users by pH 9. In augmentation of this treatment the patent also suggests adding a synthetic detergent or soap. Many such saponifiable oils contain a very small proportion of free fatty acids; their neutralization to form sodium soaps under these conditions is unavoidable. The patent goes on to point out that where the required approximately 1% of soap cannot be formed in this way, it can be obtained by deliberately saponifying some of the ester with a bit of caustic soda.

While it is not absolutely clear from these references just how much of the glyceride esters present on the spent clay are recovered as glycerides nor just how clean the clay becomes from such treatment, it should be fairly evident that some part of the glyceride esters present are recoverable. However, it must be realized also that various clays can hold onto minor but objectionable oily fractions with differing degrees of tenacity and, furthermore, that the practices shown in these two patents will not necessarily cleanse the clay to the degree necessary for meeting even moderately demanding environmental standards. The latter observation will be evident from the Examples 1–3 of this application where the highest glyceride oil recovery from spent clay occurred at a much higher pH than that at which fatty acids alone are neutralized without substantial saponification of the esters and even much above that pH where the phenolphthalein color is quite evident (pH 9). With use of even a higher pH (10.65) than these, these Examples show that about 65% of the original oil is still retained with the clay in the most favorable case for oil recovery, and at lower pH's a great deal more. All of such residual oil contents could be distinctly objectionable for using the clay as sanitary landfill.

The well-known text *Bailey's Industrial Oil and Fat Products*, Daniel Swern, Ed., Interscience Publishers, 1964, New York, N.Y., pages 785–786, teaches the saponification of the oil on such clay with aqueous caustic soda at a temperature near the boiling point of the aqueous dispersion. Substantially complete saponification of the oil present also is described in U.S. Pat. No. 1,763,167 wherein aqueous soda ash instead of caustic soda is used at temperatures of 185–210° F. (85–99° C.). (pH in excess of 11 can be attained with even very dilute soda ash in water, and such pH at elevated temperature can cause virtually complete saponification of glyceride ester.) U.S. Pat. No. 1,763,167 shows removing all but roughly 2% oil content from spent clay.

The instant process stages the washing treatment, and it includes the following advantages over prior art suggestions: it permits the recovery of appreciable glyceride esters as such from the spent clay; a more drastically alkaline stage follows a milder one to exert its more powerful cleansing action on just the remaining and often minor proportion of oily residue left; it provides highly cleansed clay suitable for sanitary landfill with a minimum of alkali reactant; and the process is uniquely adaptable to current vegetable oil processing operations which in itself adds special merit that will become evident hereinafter.

Nearly every large vegetable oil processing plant accumulates from its alkali refining of such oils a large quantity of what is called "soapstock." This soapstock can be about half water, contains an appreciable fraction of sodium soaps of fatty acids, some glyceride esters, and usually various minor proportions of unsaponifiable organic material. Usually the glyceride oil refiner either sells it for saponification to convert the esters and soaps into free fatty acids, or he does the necessary saponifying and acidulating right in his own plant to make such free fatty acids. Thus, one of the prime advantages of the instant invention is that it can combine efficiently and effectively: (a) the cleansing of oily material from the spent clay to an extremely high degree for its sanitary disposal, with (b) the recovery of some glyceride ester as such, (c) the preparation of soaps of fatty acids for recovery of the latter, and (d) the utilization of such refiner's soapstock disposal scheme or saponification process to handle process purges or whole separated aqueous bodies from the instant spent clay deoiling operation. Besides that, the process allows for a tolerance in operation in many instances where more or less glyceride ester can be recovered relative to fatty acid sold or recovered, thus giving the plant chemical operators fair latitude while practically precluding insufficient cleansing of the clay. The process is adaptable to processing spent bleaching clays from a wide variety of glyceride oils and fats, although clays from the bleaching glycerides of $C_{16-18}$ and higher fatty acids appears to be the best for processing according to the precepts of this invention.

SUMMARY OF THE INVENTION

The instant invention is a process for deoiling spent crystalline clay from the refining of glyceride oils which comprises:
  forming a primary dispersion of said spent clay with a first body of aqueous alkali at elevated temperature, thereby forming primary treated clay,
  the primary dispersing being done under conditions that are effective for removing a substantial amount of oily phase from said spent clay as glyceride esters;
  separating said primary treated clay from said primary dispersion;
  forming a secondary dispersion of said primary treated clay with a second body of aqueous alkali at elevated temperature, thereby forming a secondary treated clay,
  the secondary dispersing being under conditions that are effective for saponifying at least a major fraction of the glyceride esters present in said secondary dispersion; and
  separating said secondary treated clay from said secondary dispersion.

THE DRAWINGS

Figure 1:
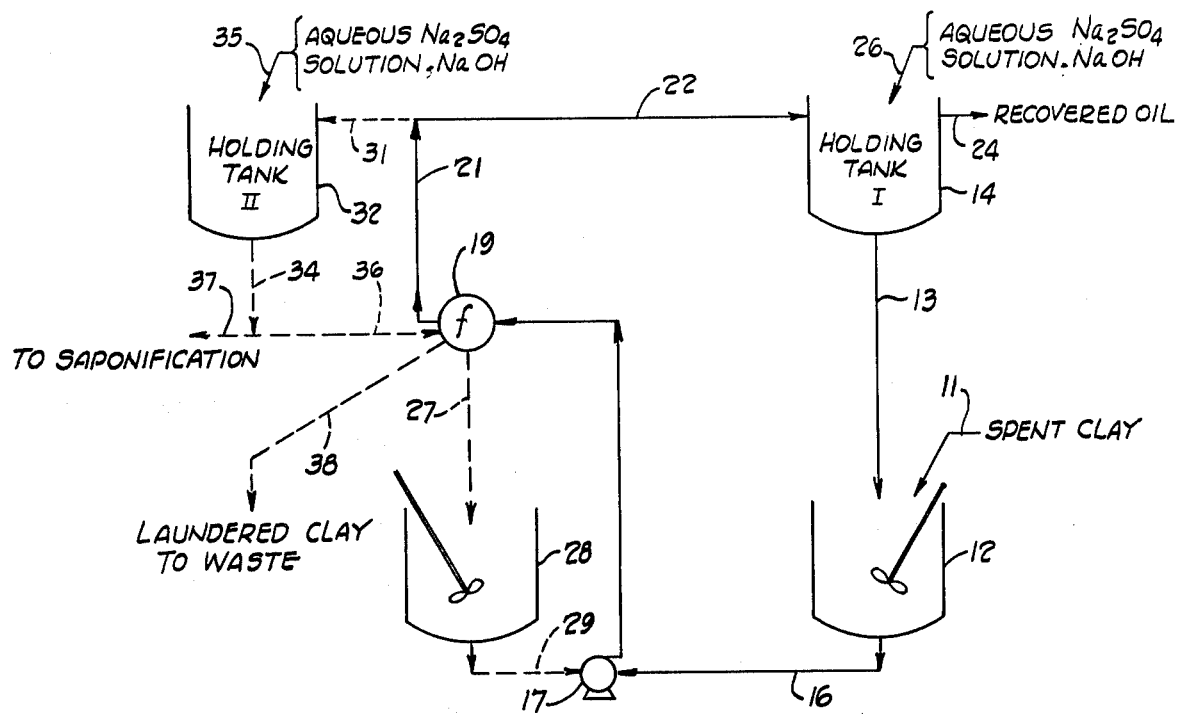
FIG. 1 is a flow diagram showing a preferred way of carrying out the present invention on a commercial scale.

Referring to FIG. 1 the spent clay 11 is charged into agitated treating tank 12 along with aqueous saline phase drawn from holding tank 14. Such saline phase usually is about 10–17% by weight sodium sulfate ($Na_2SO_4$); often it has some residual alkalinity, and it can be preheated by means not shown to 80–90° C. for such clay treatment.

In treating tank 12 pH of the recycled aqueous phase blended with the spent clay and any added diluent water or solution is brought up to about 10.6+. (Necessary makeup of hot water and/or aqueous sodium sulfate solution is added to give about four times as much water by weight as there is spent clay fed to tank 12.) Tank 12 contents are maintained with agitation at 95° C. and 10.65 pH. After a half-hour the slurry is withdrawn from tank 12 by line 16 and pump 17 and discharged through line 18 and pressure filter 19 (a Sweetland press equipped with Dutch weave stainless steel filter cloth), then out line 21. Initially a cake is built up on the filter leaves of the press by recycling the discharge from line 21 back to tank 12 by a bypass line not shown. Most of the once-treated clay is picked up in the press, but what minute amount gets through the filter leaves is unimportant as it amounts to only traces, and crystal-clear filtrate is not the main object of this filtration. When the filter cake has been built up, line 21 is connected to line 22 and the filtrate is discharged into holding tank 14. Here an oily phase of glyceride esters is permitted to accumulate as a supernatant layer over a settling period of several hours (or even longer). This supernatant phase is decanted off as recovered oil. (If desired the oil and aqueous contents of the holding tank 14 can be subjected to centrifuging to accelerate the separation of oil.)

After the oily, ester-rich layer has been removed, holding tank 14 (equipped with an agitator) can be made up with aqueous sodium sulfate solution and caustic soda, then preheated to clay treating temperature for a subsequent run in treating tank 12.

The second holding tank, tank 32, contains an aqueous solution of sodium sulfate with some free caustic soda in it and ordinarily a good deal more dissolved or dispersed sodium soaps of free fatty acids than does tank 14. Sweetland press 19 is opened to drop once-treated clay cake in the treating tank 28. Usually such clay cake is sluiced with aqueous contents from holding tank 32. Most or all of the balance of tank 32 contents is added then to treating tank 28 along with enough sodium sulfate solution or water, or even soapstock to bring up the weight of water relative to clay solids being treated to roughly 4:1. To treating tank 28 or to holding tank 32 there can be added additional aqueous sodium sulfate solution and sodium hydroxide (e.g., at least in part from soapstock) to bring up pH of the liquor in treating tank 28 to 11–12 at the end of secondary clay treating.

The secondary treating of the clay is done like primary one, with agitation, using temperature of 95° C. for about one-half hour or even longer if desired. Then the contents of treating tank 28 are withdrawn through line 29, centrifugal pump 17, line 18, through press 19, outlet 21, and recycled by a bypass line not shown to treating tank 28 until a cake is built up and the filtration is quite effective for removal of clay. At this point line 21 is connected into line 31, and the aqueous recycle goes into holding tank 32 for storage and subsequent reuse. Periodically quantities of soapy, aqueous liquor from holding tank 32 are purged through line 37 to a saponification operation, the description of which follows. Part or all of the contents of holding tank 32 can be purged this way from time to time, and the same holds true with the aqueous layer from holding tank 14.

Laundered clay cake can be washed with water on the press. Once washed it is dumped from the press through channel 38 into dump trucks, the caked clay being sluiced with plain water where necessary or desirable. This product has virtually no glycerides or fatty acids on it and can be considered a sanitary landfill for all practical purposes. It also can be reprocessed in various ways for reuse as an absorbent or catalyst.

Figure 2:
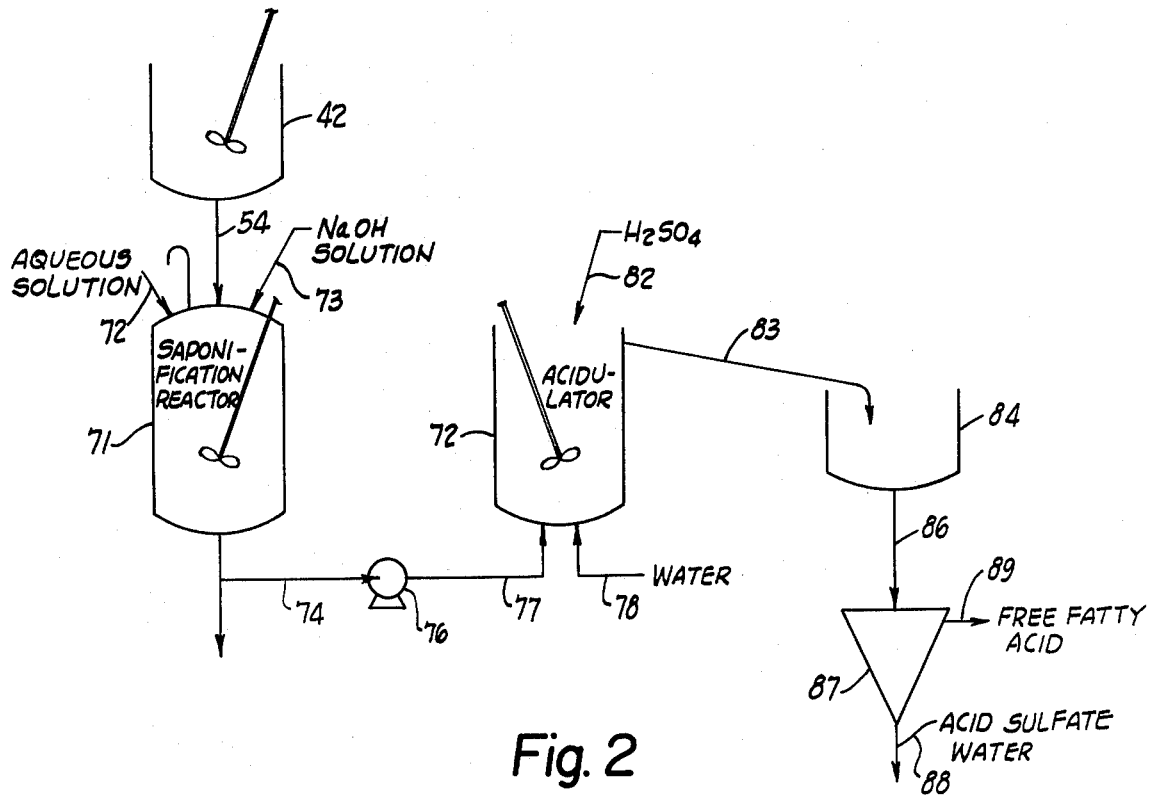
FIG. 2 is a flow diagram showing a method for saponifying an aqueous dispersion collected from such processing of spent clay. Heaters, coolers, some separators, valves and fittings, and instrumentation are not shown, but are installed where necessary or desirable.

Referring now to FIG. 2, purges from holding tank 32 are accumulated in tank 42 along with soapstock from soybean oil refining, said soapstock having typically the following analysis: water 57.3%, neutral oil (glycerides) 14.6%, free fatty acid 1.46%, unsaponifiables 1.1%, soap 14.2%, phosphatides 11.34%, phosphorus 0.797%, total fatty acid content (free and combined) 23.7%, and pH 9.5 (all percents by weight). This accumulation is fed by line 54 into agitated saponification reactor 71. To this material is added aqueous sodium sulfate solution 72, about 13% by weight from a later stage of the process, and aqueous caustic soda solution 73 sufficient to maintain pH 12 in the aqueous phase. The mixture is agitated for two hours at 180-190° F. (82-88° C.) whereupon it gets fairly viscous. The contents then are pumped out of reactor 71 through line 74 by positive displacement (gear) pump 76 and discharged into the bottom of acidulator 79 along with diluent water through line 78 and 66° Be' sulfuric acid through line 82 to give pH in the acidulator of about 2.5-3. The overflow from acidulator 79 goes through channel 83 into surge tank 84. The mixture of free fatty acids and aqueous sodium sulfate solution is fed through line 86 to centrifuge 87. From the centrifuge there is withdrawn free fatty acid product as one phase and acidic sulfate water as another. The acidic sulfate water can be neutralized with sodium hydroxide for recycle use in this saponification operation, or in the clay treatment operation described in connection with FIG. 1.

DETAILED DESCRIPTION

The temperature of treating the clay with the aqueous alkali should be at least about 40° C. and perferably 75-95° C. at one atmosphere pressure for efficiency and economy. Where super-atmospheric pressure clay washing is practiced, the temperature of the washing can go up correspondingly, e.g., to 200+°, so long as the washing mixture remains in liquid phase condition and so long as an appreciable amount of the oil of the glyceride esters on the clay can be collected as such from the first washing operation. Oily phases which are mainly glyceride esters, but can contain more or less free fatty acid, can be collected conventionally from aqueous phases by virtue of their difference in density. The spent clays to be treated are crystalline, are often naturally or chemically treated to be acidic, and they include activated clays, montmorillonites, attapulgites, kaolinites, and the like.

Preferred alkali for the clay dispersing steps of this invention for cost and effectiveness is sodium hydroxide. Soda ash also is good. Potassium hydroxide also can be used, but it is much more expensive. Ammonium hydroxide and calcium hydroxide can be used where they do not interfere with the attaining of the desired pH, but often they are inadequate for getting high enough pH readily; this is true of other metal hydroxide and carbonates also. Double decomposition of an alkaline earth metal hydroxide, e.g., calcium hydroxide, with sodium sulfate is one way of generating some alkalinity for this processing while also providing soluble salt and adding a little gypsum to the clay sediment.

In order to accelerate separation of oily from aqueous phases, it is desirable to have the aqueous phase saline. In general chlorides are avoided for generating such salinity because of their corrosive nature towards steel. Sodium sulfate is a preferred type of salinity because of its frequent availability from fatty acid springing operations, its less aggressive corrosiveness than chlorides towards ferrous metals, and its seeming ability to accelerate at least the saponification operation.

Materials of construction for the present operation can be of many kinds. Preferably mild steel is used where possible, and, where pH is low, austenitic stainless steel is preferred. If necessary, an additional clay washing stage can be added to the process, but this usually is not needed.

The type of glyceride oil which the spent clay was treating before bringing it out of service such as bleaching makes quite a difference in the first washing stage of the instant recovery processing. In general spent clays from the bleaching of domestic oils such as soybean, cottonseed, and corn oil, and generally fats and oils containing mostly $C_{16+}$ fatty acids (palm, safflower) making up their glyceride content can be processed to yield largest fractions of oily phase from such spent clay as glyceride esters in the primary dispersing operation. Thus, it is possible to get as much as 85% of such oily phase off a spent clay in the processing of soybean oil. The type of clay used makes some difference also, as certain adsorbing clays hold more or less tightly onto their oily content. The temperature and the time of dispersing also are important effects within the ranges stated (temperature preferably 75-95° C. and time preferably about 15 minutes to 3 hours), but by far the most important element in this combination of treating conditions is the pH to obtain substantially ester (oily) phase. Mixing conditions for clay washing seem best that attain large fluid displacement with only modest shear (large diameter, fairly slow-moving—e.g. 60 RPM turbines).

By removal of substantial oily phase from the spent clay we mean at least about 5% and advantageously more than 10% of the glyceride esters present on the starting spent clay being removed as glycerides. As disclosed above, operating on conventional bleaching clay for domestic oil such as soybean oil we can recover much more. When operating with spent clay from the treatment of lauric oils such as palm kernel or coconut oils, for example, there is a much greater tendency for such lauric glycerides to saponify under vigorous conditions of washing such clay (high temperature, etc.). Accordingly, the first stage clay dispersing temperature can be lower (80° v. 95°) and the time shortened somewhat (15 minutes v. 30+ minutes) and the pH of the aqueous phase of such washing kept lower (about 9.5–10.4 v. 10.6–10.65) when the spent clay is, say, coconut oil than when it is from, say, soybean oil refining. Even then the glyceride oil yield as ester is likely to be fairly low, with perhaps only 10% of what is on the clay being recovered as glycerides and the balance being recovered as free fatty acids. As can be understood, however, the instant process has special value in that what oil is not recovered as esters is recovered in the form of fatty acids, and also a highly cleansed clay is produced regardless of the fatty oil/fatty acid processing split and minor operating aberrations.

To summarize, the primary clay dispersing can be done with agitation in a few minutes to several hours, preferably in about ¼–½ hour, at temperature of at least 40° and preferably about 75°–95° using at least 1 and preferably about 4 parts of water per part of spent clay by weight, and advantageously an aqueous solution containing preferably about 10–15% by weight sodium sulfate with enough sodium hydroxide to establish final pH about 10.5–10.7 when operating on spent clay from bleaching a domestic fat or oil having mainly $C_{18+}$ fatty acids (and a little lower (9.5–10.4) for clay from bleaching a lauric oil, and 6.0–6.5 for clay from bleaching palm oil). Such pH, temperature, time and dilution advantageously are optimized for almost if not fully maximizing glyceride ester recovery from a particular spent clay feed when possible and, in any event, obtain at least about 5% glyceride ester recovery based on the glycerides on the spent clay.

The secondary dispersing can be done with agitation in about one-half to three hours or longer, using temperature of at least about 60° and preferably about 80°–90° C., water dilution of at least about 1 part and generally at least about 3 parts per part of the once-treated clay, and such pH (preferably established with NaOH) of at least about 10.95 (a little lower being possible for once-treated clay from bleaching a lauric oil), such pH, temperature, time and dilution desirably being optimized to saponify at least a major fraction of and preferably all the glyceride esters present in the dispersion, such substantial saponification having the effect of leaving a treated spent clay containing advantageously no more than about 5% organic matter and preferably a percent or two at most.

Weight ratio water to spent clay in the primary washing (dispersing) stage advantageously is at least about 1:1 to obtain ready mixing, preferably about 4:1, and should not be above about 10:1 to limit aqueous phase handling, although more water can be used if desired. The same precepts apply to the secondary washing (dispersing) stage.

Partially cleansed and fully cleansed clay preferably is separated from aqueous phase by filtration, although sedimentation, settling, or other conventional ways can be used. Centrifugation is desirable using, of course, centrifuges equipped to handle large volumes of clay solids if much of such solids are present in an aqueous stream being so processed. Thus, for example, in the saponification operation shown in connection with FIG. 2, if the equipment is adequate to handle spent clay from the secondary washing (dispersing) operation, then the entire filter cake of once-treated clay can be directed straight to the saponification operation acting as the second clay dispersing operation.

In this specification all temperatures are in degrees Centigrade, all percentages are weight percentages, and all parts are parts by weight unless otherwise expressly indicated. The following examples show the practicality of the present invention, but should not be construed as limiting it.

EXAMPLE 1

A run was made using spent bleaching clay from the refining of soybean oil (the clay when fresh being Filtrol 105, a product of Filtrol Corporation). The oil content of the starting spent clay was about 26% by weight. The spent clay had been collected as a filter cake, such cake having been steamed in the press before collection to displace some oil from it. 1200 grams of warm water diluent and 300 grams of the spent clay were heated to 95° C. in a 2000 ml agitated flask, and 50% aqueous sodium hydroxide solution was added in small increments to attain a pH of 10.65. At such point mixing was continued for a half hour, then the heating and stirring was stopped. The thus-treated clay was separated cursorily from the liquids present by settlement and filtration, then such liquids were centrifuged to recover approximately 35.5 weight percent of an oil that was mostly triglycerides.

The separated, treated clay is reslurried separately or together with about twice its weight of 13% by weight aqueous sodium sulfate solution containing sufficient sodium hydroxide to maintain a pH of 12 in the aqueous phase after the whole mixture has been agitated at temperature of 82°–88° C. for two hours. The clay filtered from this subsequent operation is virtually devoid of fatty material, the saponification of glyceride esters to fatty acid soap and glycerine virtually complete, and the filter cake can be used as though it were sanitary landfill.

If desired, to gain additional recovery of fatty acids, the aqueous layer from clay separation in the above first stage is used to dilute and reslurry the separated clay (in lieu of an aqueous sodium sulfate solution, i.e., using this liquid as a vehicle for recovery of its fatty acids and also to utilize the sodium hydroxide equivalent it already contains while adding extra sodium hydroxide for the high pH maintenance (e.g., 11–12) as is necessary). The separated aqueous soap-containing liquids from these second clay treatments then are acidulated with water and 66° Be' sulfuric acid to obtain pH of 2.5–2.7.

The resulting acidulated liquor then is centrifuged or otherwise conventionally treated to separate recovered free fatty acid, an "acid water," sludge, and whatever minor interfacial layers occur. A portion of the acid water then can be neutralized with caustic soda and recycled to either the first or second clay cleansing treatments as diluent for that operation.

EXAMPLE 2

The oil recovered from Example 1 was analyzed. The results of the analysis were as follows:

| | | |
|---|---|---|
| Weight percent clay in recovered oil | | 4.93 |
| Free fatty acids - weight percent | | 0.51 |
| Color, Lovibond | | >27R>OY |
| Triglycerides - weight percent | | 87.6 |
| Diglycerides - weight percent | | 6.2 |
| Monoglycerides - weight percent | | 4.0 |
| Polyols - weight percent | | 2.1 |
| Free and combined fatty acids persent, weight percent of fatty acids: | | |
| | $C_{12}$ | 0.1 |
| | $C_{14}$ | 0.1 |
| | $C_{15}$ | 0.1 |
| | $C_{16}$ | 10.0 |
| | $C_{17}$ | 0.1 |
| | $C_{18}$ saturated | 3.7 |

-continued

| | |
|---|---|
| Oleic | 20.2 |
| Linoleic | 49.8 |
| Linolenic | 7.0 |
| $C_{20}$ | 0.4 |
| Above fatty acids total: | 91.5 |
| Calculated Iodine Value: | 133.2 |

This oil and the oils recovered from the other exemplary runs can be recycled to a vegetable oil refining process with the fresh oil therefor.

EXAMPLE 3

An experiment was conducted using essentially the same procedure as that of Example 1, except that the spent clay was from the refining of palm kernel oil, a lauric fat, and it contained 29.1% by weight oil. The clay itself was the same variety. In various runs pH was varied from 5.90 to 9.90; there was no supernatant triglyceride oil for recovery. Within the pH range of 9.7–9.9 a considerable amount of soap was formed. This could be acidulated to yield fatty acids. Below that pH range apparently very little oil if any would separate from the clay.

Second stage treatment can be the same as that described in Example 1.

What is claimed is:

1. An elevated temperature process for deoiling spent crystalline clay from the refining of glyceride oils which comprises:

forming a primary dispersion of said spent clay with a first body of aqueous alkali at elevated temperature, thereby forming primary treated clay, the primary dispersing being done under conditions that are effective for removing a substantial amount of oily phase from said spent clay as glyceride esters;

separating said primary treated clay from said primary dispersion;

forming a secondary dispersion of said primary treated clay with a second body of aqueous alkali at elevated temperature, thereby forming a secondary treated clay, the secondary dispersing being under conditions that are effective for saponifying at least a major fraction of the glyceride esters present in said secondary dispersion;

separating said secondary treated clay from said secondary dispersion prior to acidulating same for recovery of fatty acids in a latter step of the process;

acidulating remaining aqueous phase from said secondary dispersion to spring free fatty acids therein; and recovering the resulting free fatty acids.

2. The process of claim 1 wherein a glyceride ester phase is separated and collected from at least one of said dispersions.

3. The process of claim 1 wherein the spent clay is from the refining of soybean oil, and pH of the primary dispersing is between about 10 and about 10.6.

4. The process of claim 1 wherein at least one of said bodies of aqueous alkali is saline.

5. The process of claim 4 wherein the salinity is from sodium sulfate.

6. The process of claim 1 wherein the secondary dispersing operation is conducted as a substantially complete saponification of glyceride esters present.

7. The process of claim 1 wherein at least a part of said alkali is sodium hydroxide, and included in each dispersion is a portion of aqueous phase recycled from a previous dispersing operation of the process.

8. The process of claim 1 wherein the temperature of both dispersing operations is between about 75° and about 95° C.

* * * * *

UNITED STATES PATENT AND TRADEMARK OFFICE
CERTIFICATE OF CORRECTION

PATENT NO. : 4,185,026

DATED : January 22, 1980

INVENTOR(S) : Gary W. Smith, Dwight E. Leavens and Louis R. Sims

It is certified that error appears in the above-identified patent and that said Letters Patent are hereby corrected as shown below:

Column 8, line 63, in the table, after "Free and combined fatty acids" change "persent," to --present,--.

Column 10, line 13, in claim 1, change "latter step" to --later step--.

Signed and Sealed this

Twenty-fourth Day of June 1980

[SEAL]

Attest:

SIDNEY A. DIAMOND

Attesting Officer

Commissioner of Patents and Trademarks